United States Patent [19]
Beattie

[11] Patent Number: 5,460,456
[45] Date of Patent: Oct. 24, 1995

[54] AUTOMATIC TRANSMISSION SPHERICAL ROLLER BEARING TAIL HOUSING

[76] Inventor: James C. Beattie, 6747 White Stone Rd., Baltimore, Md. 21207

[21] Appl. No.: 196,436

[22] Filed: Feb. 15, 1994

[51] Int. Cl.⁶ ............................. F16C 23/08; F16C 43/04
[52] U.S. Cl. ........................................ 384/498; 384/541
[58] Field of Search ........................ 384/495, 496, 384/497, 498, 537, 541, 558, 585; 464/178; 74/606 R

[56] References Cited

U.S. PATENT DOCUMENTS

| | | | |
|---|---|---|---|
| 1,675,065 | 6/1928 | Thomas | 464/152 |
| 2,656,227 | 10/1953 | Comery | 384/498 |
| 2,975,007 | 3/1961 | Zwicker | 384/498 |
| 3,231,039 | 1/1966 | Saurer | 180/383 |
| 3,425,239 | 2/1969 | Baier | 384/498 X |
| 3,718,378 | 2/1973 | Clay | 384/130 |
| 3,724,917 | 4/1973 | Pakulak | 384/498 |
| 3,751,124 | 8/1973 | Hanson et al. | 384/558 |
| 4,045,101 | 8/1977 | Schafer | 384/558 |
| 4,124,257 | 11/1978 | Derner et al. | 384/498 |
| 4,161,055 | 7/1979 | Weremijenko | 384/203 X |
| 4,185,880 | 1/1980 | Shiomi et al. | 384/498 |
| 4,268,096 | 5/1981 | Cain et al. | 384/498 X |
| 4,335,963 | 6/1982 | Jameson et al. | 464/178 X |
| 4,412,705 | 11/1983 | Schreiner et al. | 384/584 |
| 4,461,547 | 1/1987 | Stich et al. | 74/606 R |
| 4,616,526 | 10/1986 | Morisawa et al. | 74/606 R |
| 4,783,181 | 11/1988 | Takata | 384/450 X |
| 4,904,228 | 2/1990 | Frear et al. | 464/152 |
| 5,087,231 | 2/1992 | Yamaguchi et al. | 475/200 |

FOREIGN PATENT DOCUMENTS

| | | | |
|---|---|---|---|
| 504627 | 7/1920 | France | 384/496 |
| 337249 | 10/1930 | United Kingdom | 384/496 |

*Primary Examiner*—Thomas R. Hannon
*Attorney, Agent, or Firm*—Cushman Darby & Cushman

[57] ABSTRACT

An automatic transmission tail housing includes a bearing housing which is mountable to an automatic transmission. A spherical roller bearing is mounted in the bearing housing for supporting a portion of a coupler assembly. An inner race of the spherical roller bearing is rotatable about a longitudinal axis of an output shaft of the automatic transmission to rotatably support the coupler assembly when engaged with the output shaft. The spherical roller bearing is also pivotable about a point on the output shaft longitudinal axis so that the coupler assembly is pivotally engageable with the tail housing to compensate for misalignment between the coupler assembly and the tail housing.

7 Claims, 6 Drawing Sheets

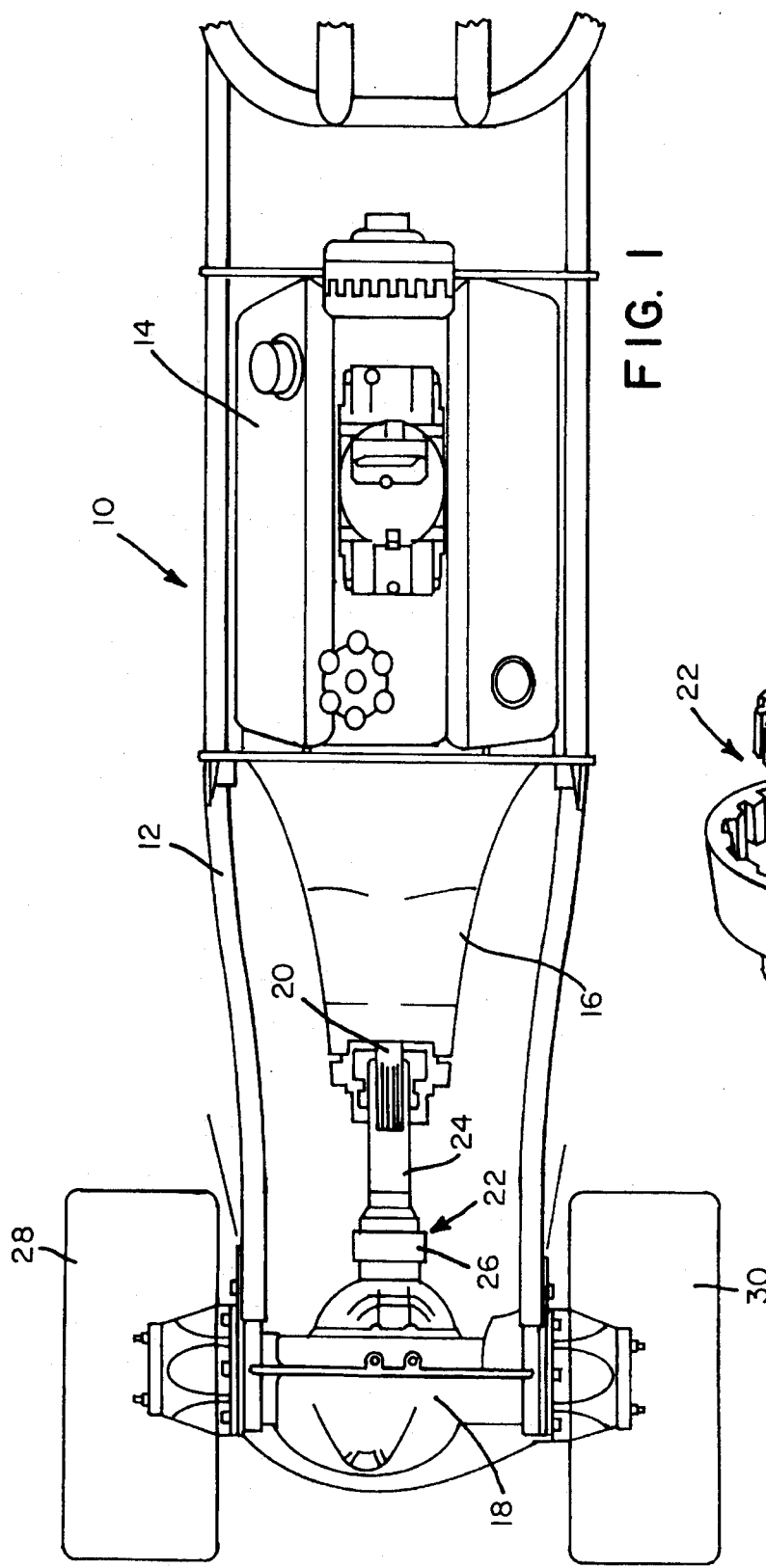
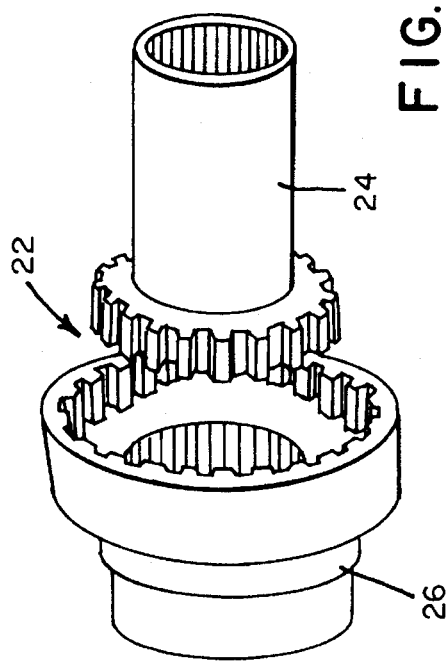
FIG. 1
FIG. 6

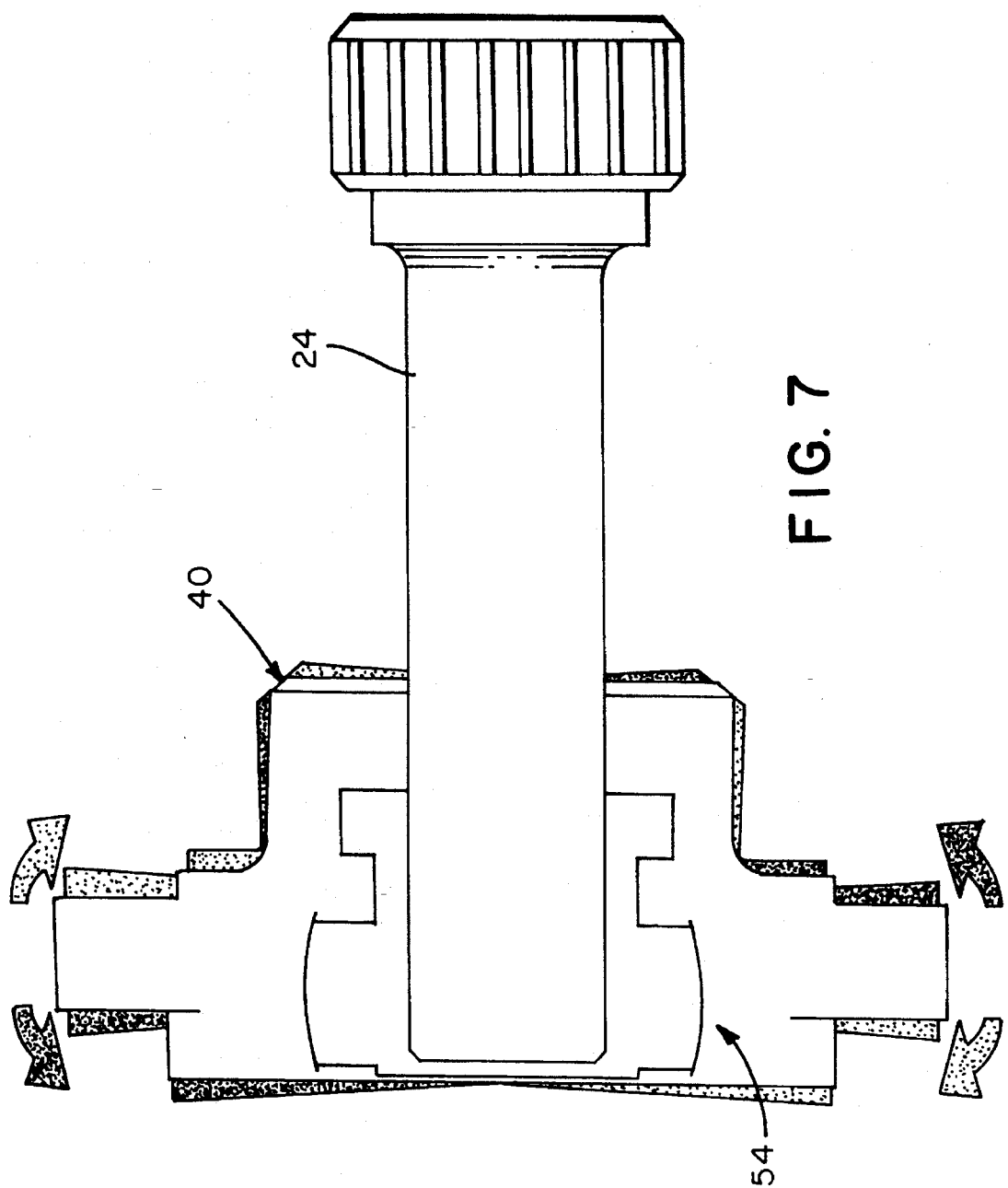

AUTOMATIC TRANSMISSION SPHERICAL ROLLER BEARING TAIL HOUSING

BACKGROUND OF THE INVENTION

1. Field of the Invention

The present invention relates to high performance automotive drag racing automatic transmissions and more particularly, to an improved tail housing for such automatic transmissions.

2. Description of the Related Art

Front engined automobiles generally utilize a drive shaft for coupling the transmission to the differential. The drive shaft generally includes a universal joint at each end to compensate for misalignment between the transmission output shaft and the differential input shaft. However, some types of drag racers are mid-engined, i.e., the engine is positioned behind the driver but ahead of the differential. This positioning of the heavy engine/transmission is to achieve a desired weight distribution in the vehicle for improved traction and handling. However, if the engine/transmission is positioned too close to the differential, there is insufficient room for a standard drive shaft and universal joints to compensate for misalignments between the transmission output shaft and the differential input shaft. Further, the engines in these drag racers generally produce great amounts of torque which, when coupled with the high traction of the drag racing tires, will cause the drag racing chassis to flex and twist during racing conditions, altering the alignment between the transmission output shaft and the differential input shaft. Uneven traction between the two driving tires will also cause the chassis to flex and twist. Thus, mere static alignment of the transmission output shaft and the differential input shaft is insufficient to maintain proper alignment during racing conditions.

In mid-engined drag racers employing automatic transmissions, a coupler assembly is used to mate the output shaft of the automatic transmission to the input shaft of the differential. The coupler assembly includes an internally splined male portion for engaging the splined output shaft of the transmission and an internally splined female portion for engaging the splined differential input shaft. The coupler assembly is relatively short and a forward portion of the coupler assembly is rotatably supported on its outer diameter by a standard bushing in the tail housing of the transmission. Because of the coupler assembly's short length and lack of universal joints, small misalignments between the transmission output shaft and the differential input shaft due to differential rotation and chassis flex and twist, will result in high loads being transmitted to the tail housing support bushing. This results in binding and increased bushing and seal failure as well as increased elapsed times and decreased top speed due to increased friction.

SUMMARY OF THE INVENTION

The present invention is a tail housing for a drag racing automatic transmission which includes a spherical roller bearing. An inner race of the spherical roller bearing is rotatable about a longitudinal axis of the spherical roller bearing to rotatably support an outside diameter of a male portion of the coupler assembly that is splined to an output shaft of the transmission. The spherical bearing is also pivotable about a point on the longitudinal axis so that the coupler assembly is pivotally engageable with the tail housing to compensate for misalignment between the differential input shaft and transmission output shaft. This misalignment compensation greatly reduces or eliminates the binding between the male portion of the coupler assembly and the tail housing. Friction between the coupler assembly and the tail housing is also reduced, resulting in lower elapsed times and higher top speeds.

The spherical bearing tail housing is a bolt-on replacement for a standard drag racing automatic transmission bushing type tail housing and is designed to operate with a standard coupler assembly.

With the foregoing in mind, other objects, features and advantages of the present invention will become more apparent upon consideration of the following description and the appended claims with reference to the accompanying drawings, all of which form part of this specification, wherein like reference numerals designate corresponding parts and various figures.

BRIEF DESCRIPTION OF THE DRAWINGS

FIG. 1 is a partial top plan view of a drag racing vehicle in which the automatic transmission spherical roller bearing tail housing of the present invention is utilized;

FIG. 6 is a detail view of a differential coupler utilized in conjunction with the present invention; and FIG. 7 is a schematic view of the present invention showing the effect of chassis flexing and twist on the tail housing of the present invention.

DETAILED DESCRIPTION OF THE PRESENTLY PREFERRED EMBODIMENTS

Figure 2:
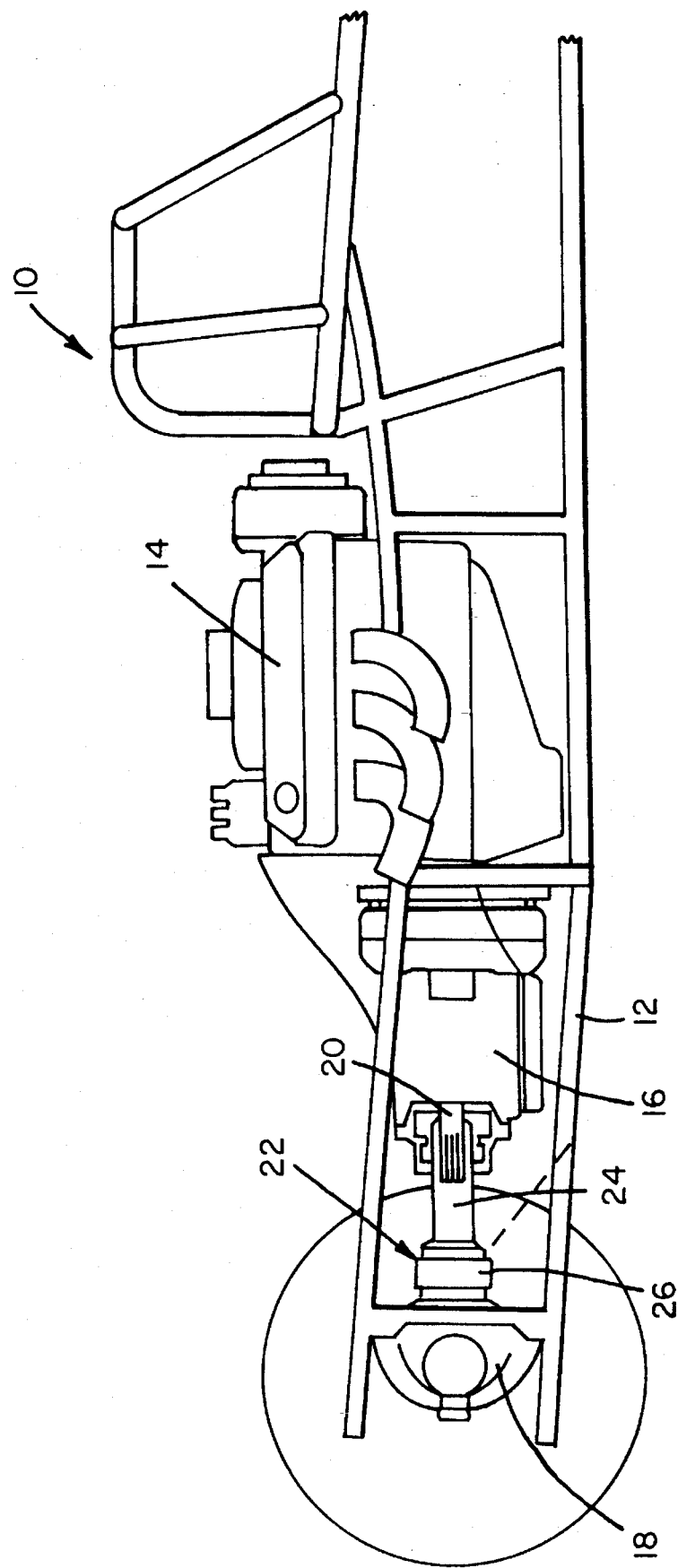
FIG. 2 is a partial side plan view of the drag racing vehicle of FIG. 1.

A rear portion of a drag racing vehicle is shown in FIGS. 1 and 2, generally indicated at 10. The drag racing vehicle 10 includes a frame or chassis 12 in which an engine 14, automatic transmission 16 and a differential 18 are mounted. An output shaft 20 of the automatic transmission 16 is connected to an input shaft (not shown) of the differential 18 by a coupler assembly, generally indicated at 22. The coupler assembly 22 includes a male portion 24 which engages a female portion 26, as can better be seen in FIG. 6. The female portion 26 engages a splined portion of the differential input shaft and the male portion 24 engages a splined portion of the transmission output shaft 20. Tires 28 and 30 are mounted on wheels (not shown) which are attached to respective axles (not shown) of differential 18. Thus, power can be transmitted from the engine 14, through the transmission 16 and coupler assembly 22 to the differential 18 to drive tires 28 and 30.

Figure 3:
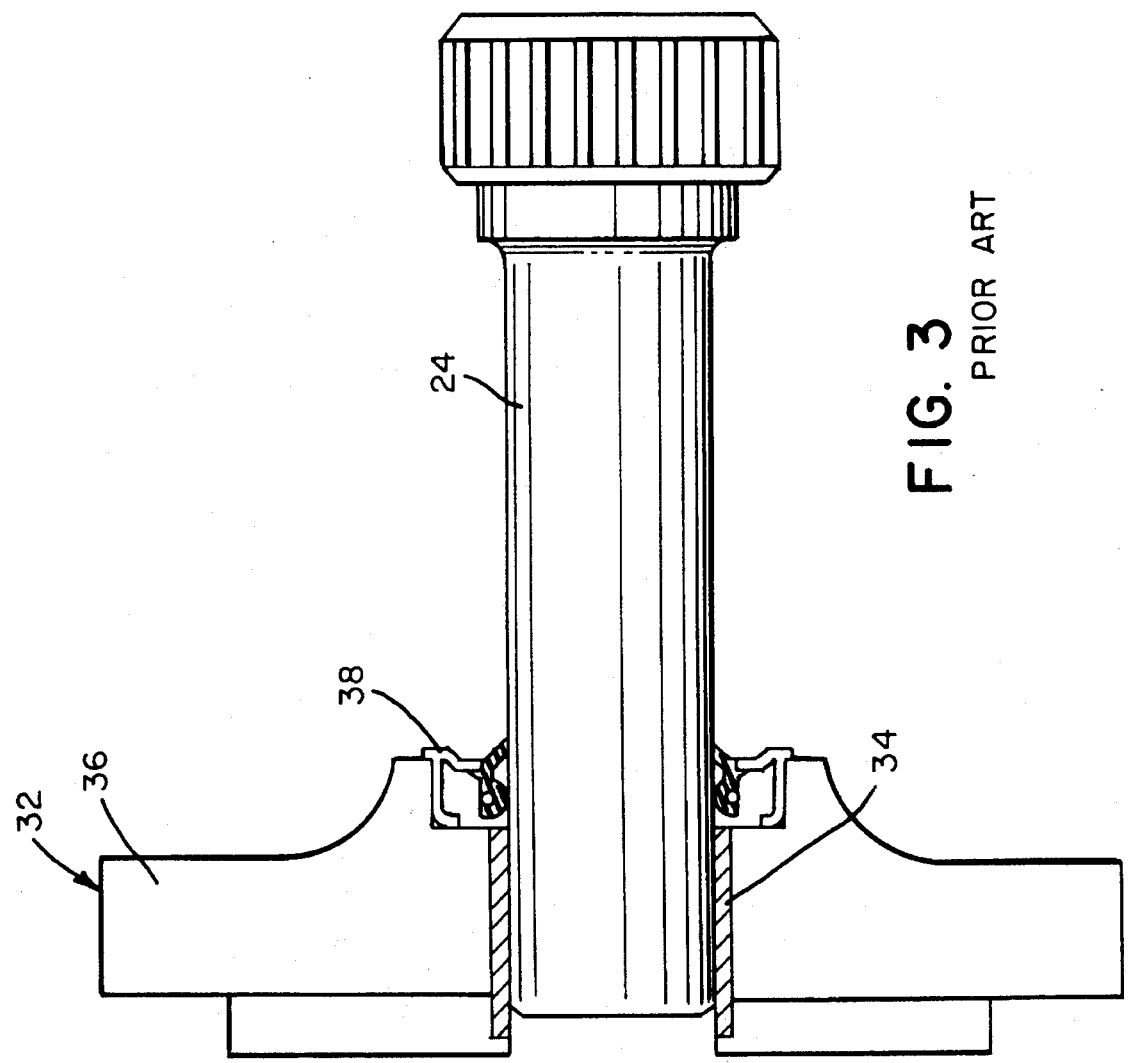
FIG. 3 (PRIOR ART) is a partial sectional view of a conventional tail housing.

In a conventional automatic transmission tail housing 32, as shown in FIG. 3 (prior art), a bushing 34 is solidly mounted in a body 36 of the tail housing which attaches to the automatic transmission. The bushing 34 supports the coupler assembly male portion 24. The bushing 34 provides acceptable support for the coupler assembly male portion 24 when a longitudinal axis of the coupler assembly male portion 24 coincides with a longitudinal axis 21 of the housing 36 and bushing 34 (which should normally also coincide with a longitudinal axis of the transmission output shaft 20). However, should these two axes not coincide, as when the chassis is flexing during a race, the coupler assembly male portion 24 will try to cock with respect to the rigidly mounted bushing 34, causing increased friction, binding and shortening the life of the bushing 34 and seal 38.

Figure 4:
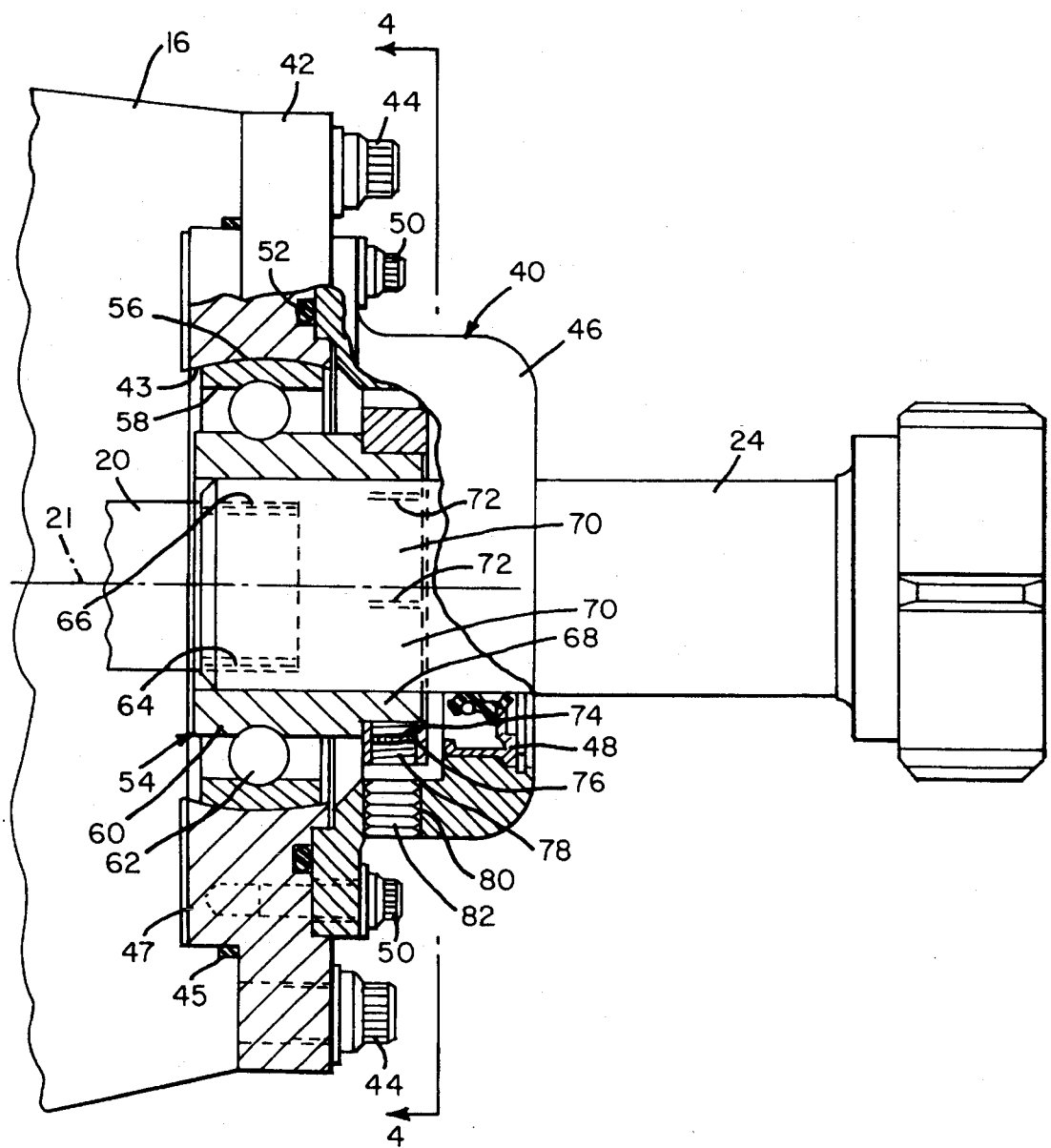
FIG. 4 is a partial sectional view of the automatic spherical roller bearing tail housing of the present invention.
Figure 5:
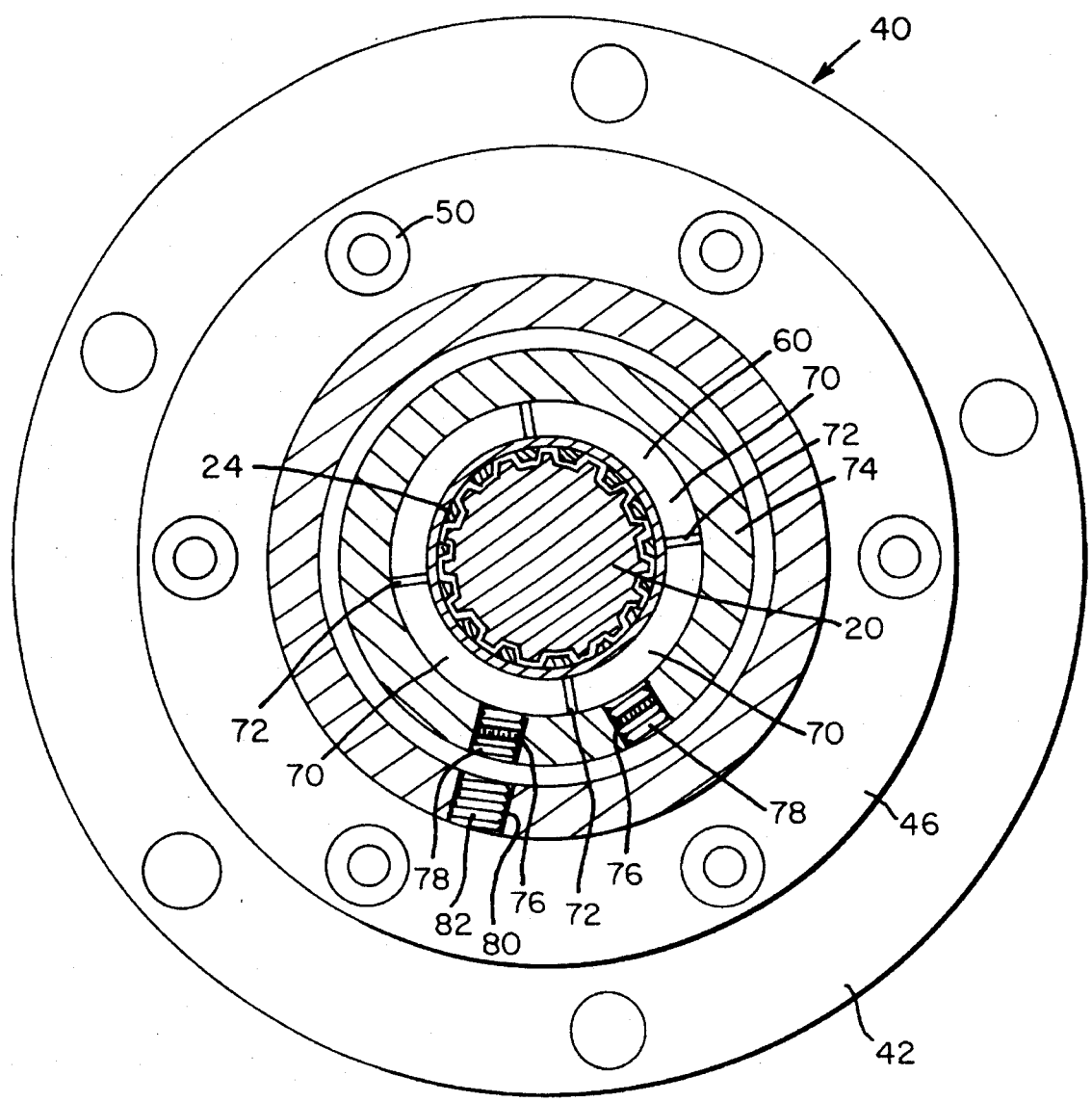
FIG. 5 is a sectional view of the automatic transmission spherical roller bearing tail housing of the present invention, taken along section line 4—4.

FIGS. 4 and 5 show an automatic transmission tail housing 40 according to the present invention. The tail housing 40 includes bearing housing 42 which attaches to automatic transmission 16 with bolts 44. O-ring 45 and gasket 47 ensure an oil tight seal between the bearing housing 42 and the automatic transmission 16. A cap 46 supports oil seal 48 and is attached to bearing housing 42 by bolts 50. An oil tight seal is maintained between bearing housing 42 and cap 46 by O-ring 52. A spherical roller bearing 54 is mounted in the bearing housing 42. A partially spherical portion 56 of an outer race of roller bearing 54 engages a partially spherical portion 43 of bearing housing 42. A conventional antirotation pin (not shown) engages a slot (not shown) in the bearing housing 42 to prevent rotation of the outer race in the bearing housing. An inner race 60 is rotatably supported in outer race 58 by a plurality of bearings 62. Thus, the inner race 60 of the spherical roller bearing 54 is rotatable about the longitudinal axis 21 of spherical roller bearing 34 and tail housing 40 to rotatably support the male portion 24 of the coupler assembly 22 when the coupler assembly is engaged with the output shaft 20. Additionally, because of the partially spherical engagement between the outer race 58 and the bearing housing 42, the spherical roller bearing 54 is also pivotable about a point on the longitudinal axis 21 of the spherical roller bearing 34 and tail housing 40 so that the coupler assembly male portion 24 is pivotally engageable with the tail housing 40 to compensate for misalignment between the male portion 24 and female portion 26.

Inner race 60 includes a stepped portion 68 which is divided into a plurality of segments 70 by a plurality of slots 72. A locking ring 74 includes at least one threaded radial bore 76 and fits over stepped portion 68. In a preferred embodiment, the locking ring includes two threaded radial bores 76 spaced apart approximately 30°. A set screw 78 is threaded into each bore 76 and can be tightened down to clamp the inner race 60 against an outer surface of the male portion 24, as can best be seen in FIG. 5. Thus, with the locking ring set screws retracted slightly, the coupler assembly male portion 24 is inserted into the tail housing 40, through the inner race and into engagement with the splined transmission output shaft 20 until the coupler assembly male portion 24 bottoms. Then the coupler assembly male portion 24 is retracted a desired amount, approximately 0.125 inch in the preferred embodiment, and then locked in this desired position by tightening the set screws 78. Access to the set screws 78 is obtained through the threaded access bore 80 which is sealed after adjustment by threaded plug 82 to maintain oil tightness.

As can be seen in FIG. 7, movement of the engine/transmission due to, for instance, chassis flexing, is compensated for by the pivoting action of the spherical roller bearing 42 in tail housing 40. Thus, binding between the coupler assembly male portion 24 and the spherical roller bearing 42 is prevented and friction between these two components is reduced. This results in quicker elapsed times and increased top speeds while reducing bearing and seal failure.

The tail housing of the present invention can be constructed from any desired materials with all dimensions being alterable as is required.

While the invention has been described in accordance with what is presently believed to be the most practical and preferred embodiment, it is to understood that the invention is not to be limited to the disclosed embodiments but on the contrary, is intended to cover various modifications and equivalent arrangements included within the spirit and the scope of the appended claims, which claims are to be interpreted in the broadest manner so as to encompass all such equivalent structures.

What is claimed is:

1. An automotive automatic transmission tail housing comprising:

a bearing housing which is mountable to an automatic transmission; and a spherical roller bearing mounted in the bearing housing for supporting a portion of a coupler assembly, an inner race of the spherical roller bearing being rotatable about a longitudinal axis of the spherical roller bearing to rotatably support the coupler assembly when engaged with an output shaft of the automatic transmission, said spherical roller bearing also being pivotable about a point on said longitudinal axis so that the coupler assembly is pivotally engageable with the tail housing to compensate for misalignment between the coupler assembly and the tail housing.

2. An apparatus as in claim 1 in combination with an automatic transmission.

3. An apparatus as in claim 2 and further comprising:

a locking ring which is engageable with and at least partially surrounds a segmented portion of the inner race, the locking ring including at least one threaded radial bore; and a set screw engageable with the threaded radial bore;

wherein the set screw is threadable into the threaded radial bore to compress the segmented portion of the inner race, thereby clamping the inner race against a portion of the coupler assembly inserted through the inner race.

4. An apparatus as in claim 1 and further comprising:

a locking ring which is engageable with and at least partially surrounds a segmented portion of the inner race, the locking ring including at least one threaded radial bore; and a set screw engageable with the threaded radial bore;

wherein the set screw is threadable into the threaded radial bore to compress the segmented portion of the inner race, thereby clamping the inner race against a portion of the coupler assembly inserted through the inner race.

5. An automotive automatic transmission comprising:

a tail housing; and a spherical roller bearing mounted in the tail housing for supporting a portion of a coupler assembly, an inner race of the spherical roller bearing being rotatable about a longitudinal axis of the spherical roller bearing to rotatably support the coupler assembly when engaged with an output shaft of the automatic transmission, said spherical roller bearing also being pivotable about a point on said longitudinal axis so that the coupler assembly is pivotally engageable with the tail housing to compensate for misalignment between the coupler assembly and the tail housing.

6. An apparatus as in claim 5 and further comprising:

a locking ring which is engageable with and at least partially surrounds a segmented portion of the inner race, the locking ring including at least one threaded radial bore; and a set screw engageable with the threaded radial bore;

wherein the set screw is threadable into the threaded radial bore to compress the segmented portion of the inner race, thereby clamping the inner race against a portion of the coupler assembly inserted through the inner race.

7. An automotive automatic transmission comprising:

a tail housing;

a spherical roller bearing mounted in the tail housing for supporting a portion of a coupler assembly, an inner race of the spherical roller bearing being rotatable about a longitudinal axis of the spherical roller bearing to rotatably support the coupler assembly when engaged with an output shaft of the automatic transmission, said spherical roller bearing also being pivotable about a point on said longitudinal axis so that the coupler assembly is pivotally engageable with the tail housing to compensate for misalignment between the coupler assembly and the tail housing;

a locking ring which is engageable with and at least partially surrounds a segmented portion of the inner race, the locking ring including at least one threaded radial bore; and a set screw engageable with the threaded radial bore;

wherein the set screw is threadable into the threaded radial bore to compress the segmented portion of the inner race, thereby clamping the inner race against a portion of the coupler assembly inserted through the inner race.

* * * * *